No. 779,247. PATENTED JAN. 3, 1905.
J. B. WEST & F. M. DU BOIS.
APPARATUS FOR TESTING ELECTRICAL RESISTANCES.
APPLICATION FILED JAN. 2, 1904.
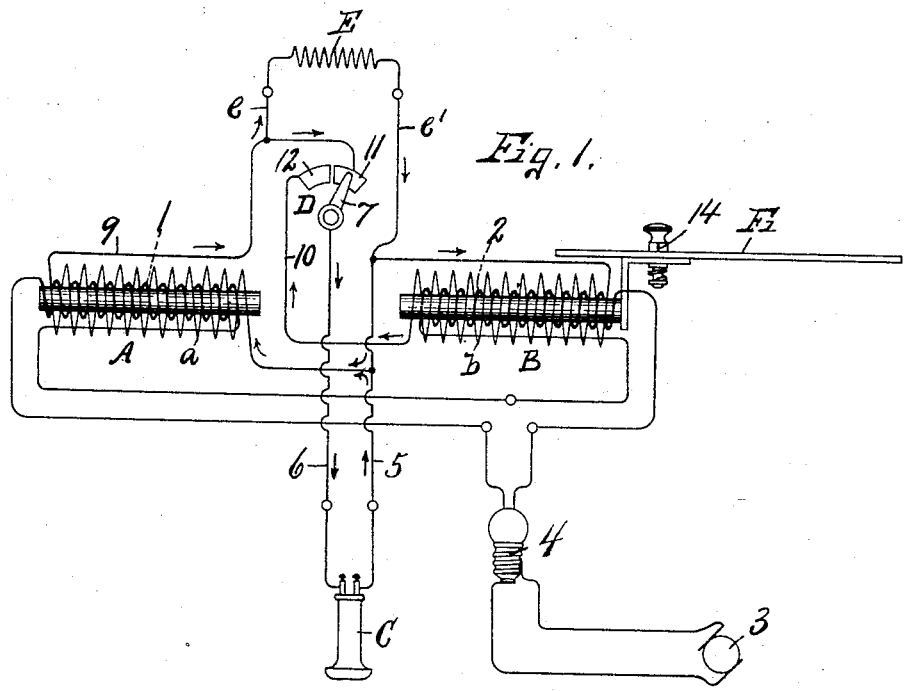
*Fig. 1.*
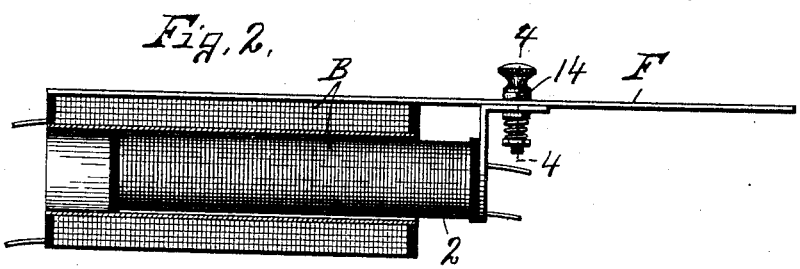
*Fig. 2.*
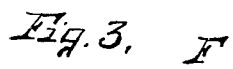
*Fig. 3.*
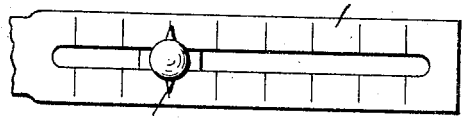
*Fig. 4.*
WITNESSES,
B. E. Robinson.
H. E. Chase.
INVENTOR.
John B. West and
Frederick M. DuBois
BY
Howard P. Denison
ATTORNEY.
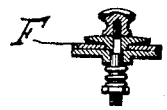

No. 779,247.

Patented January 3, 1905.

UNITED STATES PATENT OFFICE.

JOHN B. WEST AND FREDERICK M. DU BOIS, OF SYRACUSE, NEW YORK; SAID DU BOIS ASSIGNOR TO SAID WEST.

APPARATUS FOR TESTING ELECTRICAL RESISTANCES.

SPECIFICATION forming part of Letters Patent No. 779,247, dated January 3, 1905.

Application filed January 2, 1904. Serial No. 187,563.

*To all whom it may concern:*

Be it known that we, JOHN B. WEST and FREDERICK M. DU BOIS, of Syracuse, in the county of Onondaga, in the State of New York, have invented new and useful Improvements in Apparatus for Testing Electric Resistances, of which the following, taken in connection with the accompanying drawings, is a full, clear, and exact description.

This invention relates to apparatus for testing electric conductors of known resistance, such as the armature and field windings of dynamos and motors.

The object is to ascertain whether or not the conductor is perfect or of normal or standard resistance and if not to locate approximately the cause of the variation, so that the affected part may be speedily repaired. This is accomplished by alternately connecting an audible or visible current-strength indicator in circuit with the secondary windings of two separate induction-coils by means of a two-point electric switch and connecting the conductor to be tested in circuit and in parallel with the indicator and one of the secondary coils, the primary windings being connected in series to any available source of electric energy, as an incandescent-lamp circuit, and the primary winding of one of the coils being slidable axially along a suitable scale to vary the strength of the induced current and at the same time indicate the variation in the resistance of the part being tested.

Other objects and uses will appear in the subsequent description.

In the drawings, Figure 1 is a diagrammatic view of an apparatus for carrying out the objects stated. Fig. 2 is a longitudinal sectional view through one of the induction-coils, showing the primary winding as adjustable relatively to the secondary winding and also showing the means for indicating the degree of adjustment. Fig. 3 is a plan view of the detached scale. Fig. 4 is a sectional view taken on line 4 4, Fig. 2.

Similar reference characters indicate corresponding parts in all the views.

In carrying out the objects above stated we provide two separate induction-coils A and B, having their primary windings 1 and 2 electrically connected in series and receiving current from a source of electrical energy, as a dynamo 3.

One terminal of a receiver C is electrically connected by a wire 5 to one end of each of the secondary windings, as $a$ and $b$, of the induction-coils A and B, and the other terminal of the receiver is also connected by a wire 6 to a movable contact-piece 7 of a two-point switch D, while the other ends of said secondary windings are connected, respectively, by wires 9 and 10 to terminals 11 and 12 of the switch C, so that the receiver may be alternately placed in circuit with either of the secondary windings irrespective of the other by simply moving the member 7 from one terminal to the other.

When it is desired to test a conductor, as a winding E, one pole of the part E is electrically connected by a wire $e$ to the secondary winding of one of the induction-coils, as to the wire 9 of the coil A, and the other pole is similarly connected by a wire $e'$ to the receiver through the wire 5, and it therefore follows that when the receiver is in circuit with the secondary winding of the coil A a portion of the current passes through or into the part E to be tested.

The primary winding of the induction-coil B is adjustable endwise relative to its secondary winding to vary the strength of the induced current in said secondary winding and is provided with a suitable indicator-finger 14, which is movable along a graduated bar or scale F, the graduations of which represent the known resistances of the conductors to be tested.

Operation: The part to be tested is first connected in circuit with the receiver and secondary winding of the coil A, as above described, and the plug 4 is then inserted in its lamp-socket, and thereby connects the primary windings of both induction-coils in the lamp-circuit. This sets up induced currents in both of the secondary windings, and the switch member 7 is placed in contact with the terminal 11 to close the circuit through the secondary winding of the coil A and receiver C and also through the part E, which is being tested, it being understood that this induced current is divided between the receiver C and part E. The primary winding of the coil B is now adjusted by hand, so that the pointer 14 indicates upon the scale 13 the known resistance of the part E, and the receiver C is then placed to the ear, whereupon the current pulsations or succession of current-waves in the primary and secondary windings of the coil A become clearly audible. The test now begins by shifting the switch into contact with the terminal 12 to close the induction-circuit through the secondary winding of the coil B and receiver C and to cut out of circuit the secondary winding of the coil A and also the part E. If no variation in sound at the receiver is discernable, it indicates that the current strength in the secondary winding of the coil B and receiver C when the switch is on the terminal 12 is equal to the current shunted through the receiver when the switch is on terminal 11 and that the resistance of the part E is normal or standard, and therefore needs no alteration or repair; but if, on the other hand, the winding E is short-circuited between its ends then the resistance therein is below normal or standard and the sound at the receiver is proportionately weaker and clearly distinguishable from the former sound. Now to locate approximately the position of the short circuit, which is somewhere between the maximum known resistance indicated on the scale by the relative position of the primary winding 2 and the minimum resistance, the primary winding of the induction-coil B is moved axially from the point indicating the normal known resistance to include a less number of convolutions of the secondary winding to decrease the current strength therein until the normal sound is restored, or rather until the same sound is manifest, when the switch C is shifted from one point or terminal to the other. This movement is comparative with the full movement of the primary winding 2 as indicating maximum to minimum resistance of the part being tested, and thereby determines the relative number of convolutions (if the part being tested is a winding) from one extreme to the point of short circuit in the tested part which may then be speedily repaired. In a similar manner any break in the convolutions of a winding may be detected. In such case the sliding primary coil is adjusted from the normal setting for the known resistance to increase the current strength in the secondary winding of the induction-coil B until the sound at the receiver is the same when the switch is shifted from one terminal to the other.

Although we have shown and described a receiver for detecting the variations in the current strengths of the induced current, it is evident that any other audible visual detector may be employed without departing from the spirit of our invention and that instead of using an induction-coil, as B, any other equivalent device may be used to produce the same effect.

Having thus described our invention, what we claim, and desire to secure by Letters Patent, is—

1. In an apparatus for testing electrical resistances, the combination of two induction-coils having their primary windings electrically connected in series, one of the primary windings being adjustable to vary the current strength in its secondary winding, means to indicate the degree of such adjustment, testing-terminals and a current-strength indicator both electrically connected in parallel with the secondary winding of one of the coils.

2. In an apparatus for testing electrical resistances, the combination of two induction-coils having their primary windings electrically connected in series, one of the primary windings being adjustable to vary the current strength in its secondary winding, means to indicate the degree of such adjustment, a current-strength indicator and means electrically connecting the same in circuit with each of the secondary windings of the induction-coils separately from the other, the resistance to be tested being placed in circuit with one of the secondary coils and current-strength indicator.

3. In an apparatus for testing electrical resistances, the combination with a source of electric energy, of two induction-coils receiving current from said source, one of the windings of one coil being adjustable relatively to its other winding for varying the current strength in the secondary winding, testing-terminals electrically connected to the secondary winding of one of the coils, and a current-strength-indicating device electrically connected to the same secondary winding as the testing-terminals.

4. In an apparatus for testing electrical resistances, the combination of an induction-coil, a telephone-receiver and an electric switch both connected in circuit with the secondary winding of the coil, said circuit also including the part to be tested, and a second induction-coil having one of its windings movable relatively to the other to vary the current strength in the secondary winding, and means to electrically connect the secondary winding of the second coil with the receiver.

5. In an apparatus for testing electrical resistances, the combination with a source of electric energy, of two inductive coils receiving current from said source, testing-terminals electrically connected to the secondary windings of the coils, a telephone-receiver, and means to electrically connect the receiver first with one and then with the other of the secondary windings.

6. In an apparatus for testing electrical resistances, the combination with a source of electric energy, of two inductive coils receiving current from said source, one of the windings of one coil being adjustable relatively to its other winding, testing-terminals and a telephone-receiver electrically connected in parallel with the other coil, and an electric switch for electrically connecting the receiver first with one and then with the other of the secondary windings.

7. In an apparatus for testing electrical resistances, the combination with two inductive coils having their primary windings connected in series, a telephone-receiver and testing-terminals electrically connected in parallel with one of the secondary windings, and means to cut the receiver out of circuit with the other secondary winding.

8. In an apparatus for testing electrical resistances, the combination with two inductive coils having their primary windings connected in series, a telephone-receiver and testing-terminals electrically connected in parallel with one of the secondary windings, and means to cut the receiver out of circuit with one of the secondary windings and to connect it in circuit with the other secondary winding, one of the windings of one of the coils being adjustable relatively to its other winding, and means to indicate the degree of such adjustment.

9. In an apparatus for testing electrical resistances, the combination with a two-point electric switch, of a telephone-receiver having one terminal electrically connected to the switch, two electric circuits deriving current from the same source and each having one pole connected to the receiver and their other pole connected respectively to the two points of the switch.

10. In an apparatus for testing electrical resistances, the combination with a two-point electric switch, of a telephone-receiver having one terminal electrically connected to the switch, two electric circuits deriving current from the same source and each having one pole connected to the receiver and their other poles connected respectively to the two points of the switch, and means for varying the strength of the current in one of the circuits.

In testimony whereof we have hereunto set our hands this 22d day of December, 1903.

JOHN B. WEST.
FREDERICK M. DU BOIS.

Witnesses:
H. E. CHASE,
MILDRED M. NOTT.